June 25, 1929.   D. S. HARDER ET AL   1,718,461
MOUNTING MEANS FOR VEHICLE ENGINES
Filed Nov. 19, 1925
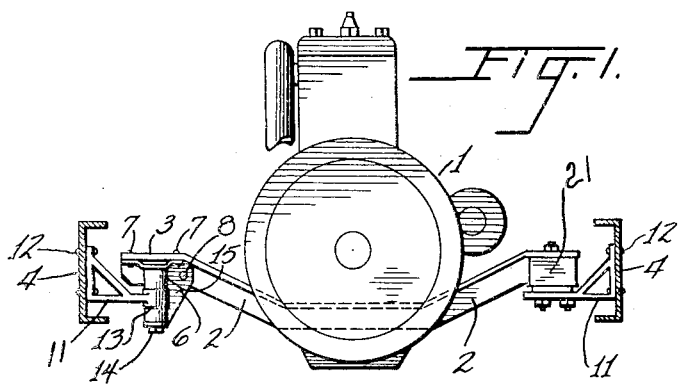
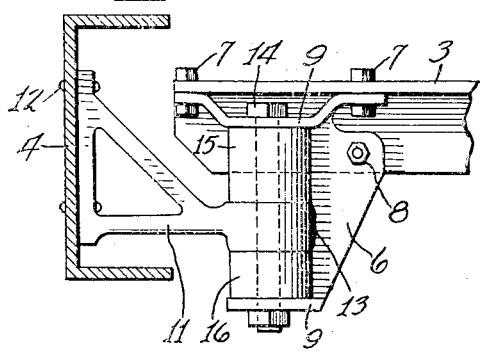   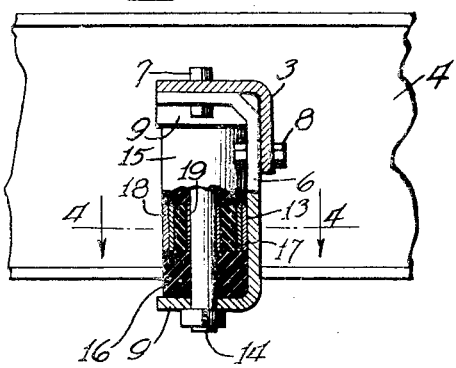
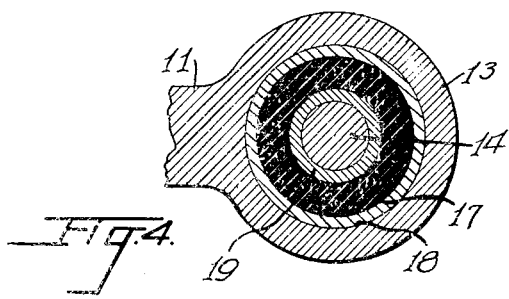
INVENTORS
F. W. VROOMAN
BY D. S. HARDER
Harry C. Schroeder
ATTORNEYS.

Patented June 25, 1929.

1,718,461

UNITED STATES PATENT OFFICE.

DELMER S. HARDER AND FRANK W. VROOMAN, OF OAKLAND, CALIFORNIA, ASSIGNORS TO DURANT MOTOR CO., OF OAKLAND, CALIFORNIA, A CORPORATION.

MOUNTING MEANS FOR VEHICLE ENGINES.

Application filed November 19, 1925. Serial No. 70,086.

The present invention relates to mounting means for internal combustion engines, and is particularly designed to produce a cushioning effect whereby the transmission of vibration from the engine to its support and vice versa is prevented or at least lessened.

While our invention may be used in connection with any internal combustion engine, it was particularly developed for use in connection with motor vehicles or boats, but the fact that a motor vehicle has been used for the purpose of illustrating the idea of the present invention is not to be construed as a limitation of our invention to that particular field.

The device described in the present application is a modified form of that shown and described in the copending application Serial No. 70,087, filed November 19, 1925, and, while following the general principle of the said device, departs in structural features. The general idea of the invention is to interpose a cushioning element, such as rubber of substantial thickness, between the power plant and the frame and to introduce rigid means for stabilizing the cushion member to such an extent that it does not yield too readily and gives substantial support to the power plant.

A particular feature of the device hereinafter to be described is that it has certain characteristics differing from those of the device shown in the copending application and may be used to advantage in connection with the same, although it may be used alone. When used in connection with the cushioning means of the copending application it tends more than the other cushioning means to prevent lateral shifting of the engine and we find that under certain conditions it is well to use at least one of the cushioning means of the present application with three of those of the other application.

The form selected for this application is illustrated in the accompanying drawing, in which—

Figure 1 shows an assembly view of the power plant, the frame of the chassis, the mounting means of the present application on one side, and that of the copending application on the other side.

Figure 2 an enlarged elevation of one mounting means,

Figure 3 is a side view of the latter with a portion shown in section and,

Figure 4 a sectional view taken along the line 4—4 of Figure 3.

Various changes or modifications may be made of this device within the scope of the claims hereto attached without departing from the spirit of the invention.

Referring first to Figure 1, it will be seen that the power plant 1 is partly supported on a transverse member 2 which may be an angle iron and the ends 3 of which are supported by the channels 4 forming part of the frame of the vehicle chassis.

Interposed between the transverse bar 2 and vehicle chassis frame on one side is the mounting means forming the subject-matter of the present application, which includes a bracket 6 secured to the angle iron 2 by means of bolts 7 and 8 and terminating in two parallel arms 9, and bracket 11 secured to the channel 4 by means of bolts 12 and terminating in a lug 13 which latter may be interposed between the two arms of the bracket 6 in such a manner that considerable space is left between the lug and either of the arms 9.

A bolt 14 extends through the two arms and a perforation in the lug 13 and two cushioning members 15 and 16 being preferably made of rubber and being of substantial thickness are interposed between the lug 13 and the two arms 9 respectively, so as to surround the bolt 14.

The perforation in the lug 13 is made considerably larger than is necessary for the accommodation of the bolt 14, and the space thus provided is filled by a rubber sleeve 17 and bushings 18 and 19 disposed on the outside and the inside of the rubber sleeve respectively, the bushing and the rubber sleeve just filling the space between the bolt and the lug 13.

The rubber between the two bushings is under compression so that no movement takes place at the contacting faces and all movement is confined to the bolt 14 riding in the sleeve 19.

This construction takes care of slight disalignment of the bolt 14 relative to the bearing when the chassis twists going over rough ground, but prevents any horizontal displacement or lateral shifting of the engine relative to the frame.

On the other side of the engine is shown the cushioning member 21 which has been described in detail in the co-pending application.

The arrangement described hereinabove has been actually tested by us in connection with a popular four cylinder automobile and has proven very successful, in so far as it absorbs vibrations and makes the motor run smoothly, evening out the periodic impulses ordinarily emphasized in four cylinder engines.

We claim:

1. In a motor vehicle, the combination of a vehicle frame element, a power generating element supported thereby and cushioning means introduced between said elements, the latter comprising a yoke associated with one of the elements, a bearing associated with the other element made for inter-position between the arms of the yoke in spaced relation to both of them, a bolt passing through the arms of the yoke and the bearing and heavy bodies of rubber-like material interposed between the bearing and each yoke arm so as to surround the bolt and means between the bolt and the bearing slightly yielding to lateral pressure.

2. In a motor vehicle, the combination of a vehicle frame element, a power generating element supported thereby and cushioning means introduced between said elements, the latter comprising a yoke associated with one of the elements, a bearing associated with the other element made for interposition between the arms of the yoke in spaced relation to both of them, a bolt passing through the arms of the yoke and the bearing, and heavy bodies of rubber-like material interposed between the bearing and each yoke arm so as to surround the bolt and a rubber sleeve incorporated in the bearing adapted to slightly yield to lateral pressure.

3. Means for mounting one element on another comprising a yoke associated with one of the elements, a lug associated with the other adapted to be introduced between the arms of the yoke in spaced relation to both of them, cushioning members between the lug and each of said arms and compressible means for maintaining the yoke arms, the cushioning members and the lug in alignment, including lateral cushioning means within the lug.

In testimony whereof we affix our signatures.

DELMER S. HARDER.
FRANK W. VROOMAN.